United States Patent [19]
Sehgal et al.

[11] Patent Number: 5,721,181
[45] Date of Patent: Feb. 24, 1998

[54] ABRASION RESISTANT GLASS

[75] Inventors: Jeetendra Sehgal; Junichiro Kase; Akira Takada; Hideo Takahashi; Yasumasa Nakao; Seturo Ito, all of Yokohama, Japan

[73] Assignee: Asahi Glass Company Ltd., Tokyo, Japan

[21] Appl. No.: 722,172

[22] PCT Filed: Feb. 13, 1996

[86] PCT No.: PCT/JP96/00301

§ 371 Date: Oct. 10, 1996

§ 102(e) Date: Oct. 10, 1996

[87] PCT Pub. No.: WO96/24560

PCT Pub. Date: Aug. 15, 1996

[30] Foreign Application Priority Data

| Feb. 10, 1995 | [JP] | Japan | 7-023126 |
| Jun. 6, 1995 | [JP] | Japan | 7-139692 |
| Jun. 7, 1995 | [JP] | Japan | 7-140893 |
| Jun. 9, 1995 | [JP] | Japan | 7-143472 |
| Aug. 28, 1995 | [JP] | Japan | 7-219070 |

[51] Int. Cl.⁶ .......................... C03C 3/089; C03C 3/091
[52] U.S. Cl. .................. 501/65; 501/66; 501/69; 501/70; 501/72
[58] Field of Search .................. 501/65, 66, 69, 501/70, 72

[56] References Cited

U.S. PATENT DOCUMENTS

| 3,234,034 | 2/1966 | Jasinski et al. | 501/72 |
| 3,811,853 | 5/1974 | Bartholomew et al. | 501/56 |
| 5,264,400 | 11/1993 | Nakaguchi et al. | 501/72 |

FOREIGN PATENT DOCUMENTS

| 51-92811 | 8/1976 | Japan . |
| 56-59642 | 5/1981 | Japan . |
| 62-270439 | 11/1987 | Japan . |

*Primary Examiner*—Karl Group
*Attorney, Agent, or Firm*—Oblon, Spivak, McClelland, Maier & Neustadt, P.C.

[57] ABSTRACT

Abrasion resistant glass, which consists essentially of the following components:

| $SiO_2$ | 74 to 85.5 (wt %), |
| $B_2O_3$ | 0.5 to 5 (wt %), |
| $SiO_2 + B_2O_3$ | 76 to 88 (wt %), |
| RO | 1 to 9 (wt %), |
| $R'_2O$ | 10 to 23 (wt %), |
| $RO + R'_2O$ | 11 to 24 (wt %), |
| $Al_2O_3$ | 0 to 5 (wt %), |
| $RO/R'_2O$ (weight ratio) | at most 0.6, | provided that R is at least one member selected from Mg and Ca, and R' is at least one member selected from Li, Na and K, and of which the density measured at room temperature is at most 2.43 g/cc.

8 Claims, 2 Drawing Sheets

ABRASION RESISTANT GLASS

TECHNICAL FIELD

The present invention relates to glass, of which the abrasion resistance is very high.

BACKGROUND ART

Glass is essentially a brittle material. Particularly, its strength decreases by fine surface defects which form during its use, and if a force is exerted to such defects, cracks will spread from these fine defects, leading to breakage.

Therefore, in order to increase the durability of glass, attempts have been made for a long time to improve abrasion resistance of the surface by incorporating a hard coating on the surface, for example. However, such a technique is not an attempt to essentially overcome the brittleness of glass itself. Accordingly, there is a problem that once the surface coating is removed by abrasion or deterioration, for example its effects will no longer be obtained.

On the other hand, sodalime silica glass which is presently most widely employed, usually has the following composition, although there has been some change historically:

|       |                |
|-------|----------------|
| $SiO_2$ | 66 to 75 wt %, |
| MgO   | 0 to 5 wt %,   |
| CaO   | 7 to 12 wt %,  |
| $Na_2O$ | 12 to 20 wt %, |
| $K_2O$  | 0 to 3 wt %,   |
| $Al_2O_3$ | 0 to 4 wt %.   |

Not so much research has been done on the relationship between the composition and the hardness with respect to sodalime silica glass. According to general common knowledge, if the silica content is increased, the hardness will increase; if CaO is substituted for $Na_2O$, the network bonding will increase to improve the strength; an addition of $Al_2O_3$ serves to increase the strength and the hardness as well.

Further, abrasion hardness corresponding to scratchability of the surface, is important for determining the practical strength of glass, but it does not necessarily have a good correlation with the Vickers hardness. This is believed to be attributable to the fact that the abrasion resistance is not only a factor relating to the hardness, but also susceptible to an influence of the frictional heat or falling off of glass fragments from a test piece due to formation and spreading of fine cracks.

In glass of sodalime silicate type, if the component ratio of silica is increased simply to increase the hardness in accordance with the conventional knowledge, it tends to be hardly meltable, whereby its production by a melting method with good productivity, will be impossible.

Glass having a relatively high silica component ratio, is disclosed in the specification of U.S. Pat. No. 3,811,853. However, such glass is limited to an application for decomposable containers, and it does not have adequate water resistance to be used as glass of general use.

An object of the present invention is to overcome the brittleness of glass itself thereby to prevent formation of abrasion marks by an external force during its practical use and to provide glass which is hardly breakable and which is relatively easily meltable in spite of high abrasion resistance. Another object is to provide glass which has, in addition to the above properties, durability (particularly water resistance) comparable to conventional sodalime silicate glass.

DISCLOSURE OF THE INVENTION

The present invention provides abrasion resistant glass, which consists essentially of the following components:

|                        |                 |
|------------------------|-----------------|
| $SiO_2$                | 74 to 85.5 (wt %), |
| $B_2O_3$               | 0.5 to 5 (wt %), |
| $SiO_2 + B_2O_3$       | 76 to 88 (wt %), |
| RO                     | 1 to 9 (wt %),  |
| $R'_2O$                | 10 to 23 (wt %), |
| $RO + R'_2O$           | 11 to 24 (wt %), |
| $Al_2O_3$              | 0 to 5 (wt %),  |
| $RO/R'_2O$ (weight ratio) | at most 0.6,    | provided that R is at least one member selected from Mg and Ca, and R' is at least one member selected from Li, Na and K, and of which the density measured at room temperature is at most 2.43 g/cc.

BEST MODE FOR CARRYING OUT THE INVENTION

Figure 1:
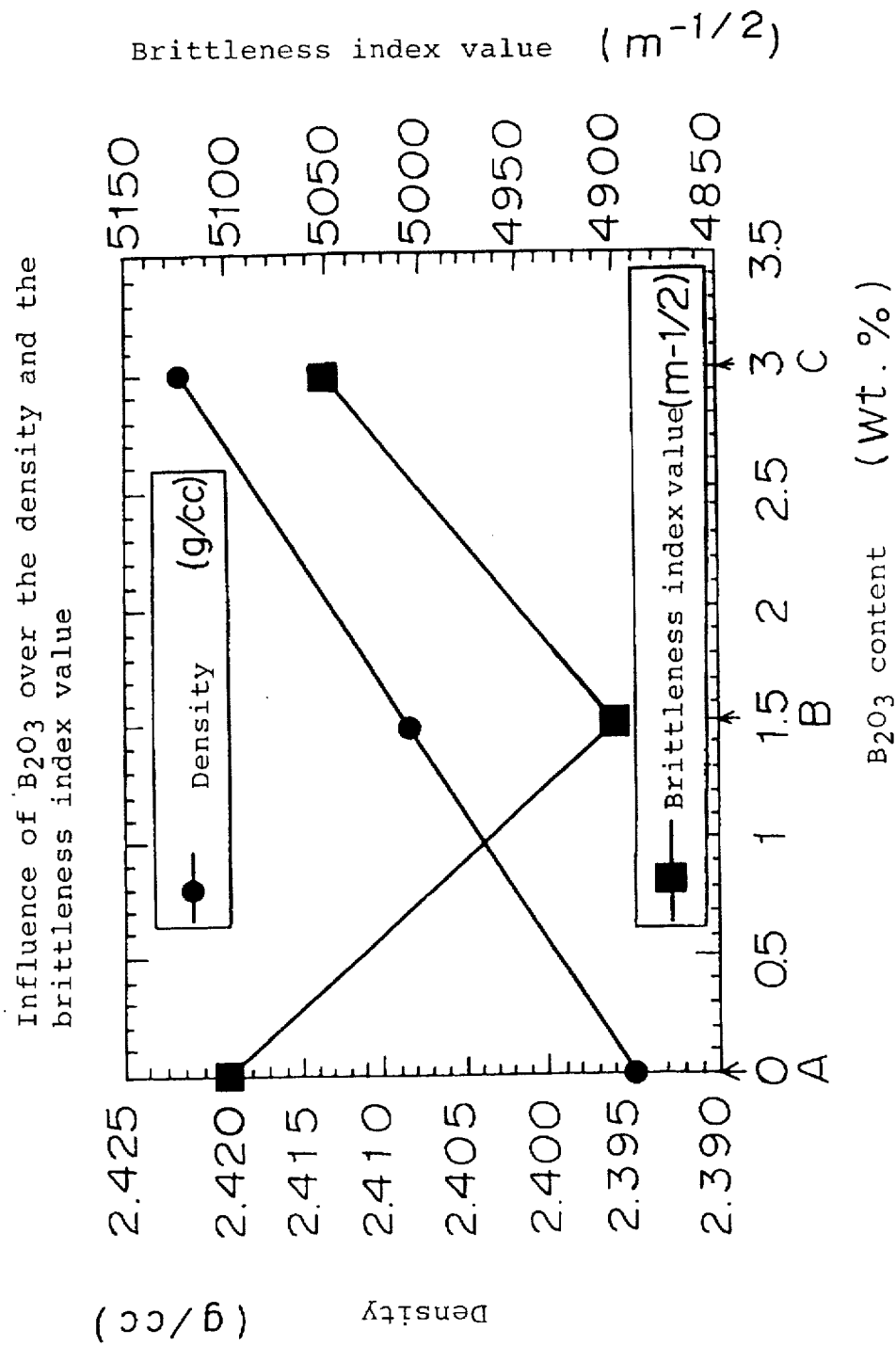
FIG. 1 is a graph showing the effects of addition of $B_2O_3$.
Figure 2:
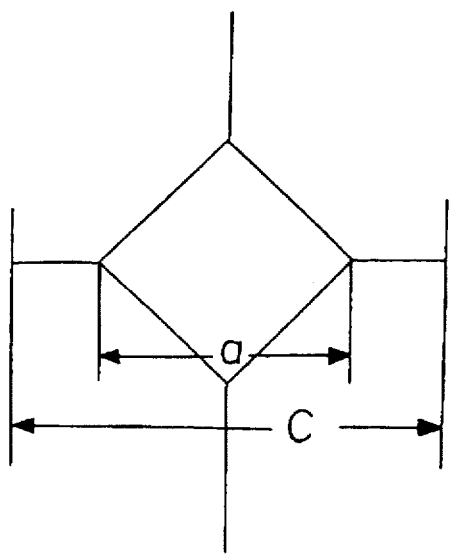
FIG. 2 is a schematic view for explaining the definition of the brittleness in the present invention.

The present inventors have studied in detail the relationship between the composition and the abrasion resistance with respect to various sodalime silica glasses and as a result, have found that within the above-mentioned range of the glass composition, glass is made to have a density of at most 2.43 g/cc (the density of usual sodalime silica glass being at a level of from 2.49 to 2.52 g/cc), whereby it becomes hardly scratchable as compared with conventional sodalime silica glass.

Namely, the present invention is based on a discovery that in sodalime silica glass, density is a factor which is closely related to abrasion resistance, its control is possible within a certain compositional range, and glass satisfying the specific compositional range and the density, has durability and is relatively easily meltable, and it is also excellent in abrasion resistance. Namely, as shown in the Examples given hereinafter, by optimizing the composition, it is possible to obtain glass which is readily meltable and of which the abrasion mark-forming load is higher by at least 5 times than usual sodalime silica glass, and the practical strength is substantially improved.

Now, the compositional range of the glass of the present invention will be described.

$SiO_2$ is the main component for forming the network structure of glass. If this is too small, the amount of non-crosslinking oxygen relatively increases, whereby the network structure will be weak, and the density will increase to facilitate propagation of cracks, whereby the strength itself will be low. On the other hand, if it is too much, the meltability tends to be poor, whereby it will be difficult to obtain uniform glass by a melting method. In the present invention, it is from 74 to 85.5 wt% based on the entire glass. With a view to securing adequate abrasion resistance, it is preferably at least 75.5 wt %. Further, it is particularly preferably at most 82 wt %, more preferably at most 80 wt %, whereby production may be carried out by a melting method by means of a large scale installation such as burner heating.

$B_2O_3$ is a component which facilitates melting of glass, and in the present invention, it is incorporated in an amount of from 0.5 to 5 wt %. $B_2O_3$ is a component which shows a special behavior with respect to the abrasion resistance, and if its amount is outside the above range, the abrasion resistance tends to decrease in any case. The preferred content is from 0.5 to 4 wt %, and a particularly preferred content is from 0.5 to 3.5 wt %.

Each of $SiO_2$ and $B_2O_3$ is a glass network former, and their total amount is from 76 to 88 wt %. To secure a proper melting property, the total amount is preferably at most 85 wt %, particularly preferably at most 84 wt %.

RO (wherein R is at least one member selected from Mg and Ca) is a component essential for improvement of the meltability and improvement of chemical durability. It is required to be at least 1 wt % in order to impart chemical durability such as alkaline resistance, and it is required to be at most 9 wt % in order to obtain adequate abrasion resistance.

As of R, there is such a tendency that the more the content of an element having a smaller element number, the better the improvement in abrasion resistance. From such a viewpoint, as R, it is preferred to increase Mg rather than Ca. Accordingly, it is preferred that MgO is an essential component. Specifically, it is preferred that MgO is from 1 to 9 wt %, and CaO is from 0 to 8 wt %. Preferably, RO is at most 8.5 wt % and at least 1.5 wt %. Specifically, MgO is from 1 to 8.5 wt %, and CaO is from 0 to 7.5 wt %.

$R'_2O$ (wherein R' is at least one member selected from Li, Na and K) is required to be at least 10 wt % to improve the meltability and required to be at most 23 wt % to avoid crystallization and to maintain the chemical resistance. To further improve the meltability, it is preferably 11.5 wt %. Further, to further improve the chemical resistance, it is preferably at the most 22 wt %. Specifically, it is preferred that $Na_2O$ is from 10 to 22 wt %, $K_2O$ is from 0 to 10 wt %, and $Li_2O$ is from 0 to 10 wt %. In an application where chemical resistance is particularly required, $R'_2O$ is preferably at most 21 wt % in a total amount, and specifically, it is preferred that $Na_2O$ is from 10 to 21 wt %, $K_2O$ is from 0 to 10 wt %, and $Li_2O$ is from 0 to 10 wt %.

The total amount of RO and $R'_2O$ is from 11 to 24 wt %. If RO+$R'_2O$ is less than 11 wt %, the meltability tends to be poor, and if it exceeds 24 wt %, it tends to be difficult to obtain high abrasion resistance. To obtain high abrasion resistance, it is preferably at most 23 wt %, more preferably at most 22 wt %.

The compositional ratio of RO to $R'_2O$ is substantially influential over the abrasion resistance. Specific functions of the respective components have not yet been understood in detail, but as is evident from the Examples given hereinafter, in the present invention, the abrasion resistance is improved by an addition of $R'_2O$ rather than RO. At least this result does not agree with the conventional knowledge about strength. From this viewpoint, in the present invention, it is necessary that the weight ratio of RO/$R'_2O$ is at the most 0.6, preferably at most 0.5. Further, in a case where the total amount of RO and $R'_2O$ is restricted within the preferred range, the respective ranges of RO and $R'_2O$ may then be restricted to bring the weight ratio of RO/$R'_2O$ to the predetermined value.

By an addition of a small amount of $Al_2O_3$, the chemical durability of glass can be remarkably improved. To suppress phase separation, it is very preferable to incorporate it in an amount of at least 1 wt % of the glass. Further, excessive addition tends to bring about deterioration of abrasion resistance, and accordingly, it is at most 5 wt %, preferably at most 4 wt %.

In the present invention, "essentially" means that the main components comprising $Si_2$, $Al_2O_3$, $B_2O_3$, RO and $R'_2O$ constitute at least 96 wt % of the entire glass. As other components in very small amounts, Fe, Ni, Se, Co, Ce, etc. may be incorporated for the purpose of homogenizing the entire glass, coloring, or controlling the infrared transmittance and ultraviolet transmittance.

Further, to facilitate the production of more homogeneous glass, a known refining agent may be incorporated. As such a refining agent, $SO_3$, Cl, $As_2O_3$, or $Sb_2O_3$, for example, may be mentioned.

Further, ZnO may be substituted as RO for MgO or CaO suitably within a range not to impair the effects of the present invention. Further, SrO or BaO, for example, may be incorporated within a range not to impair the effects of the present invention and in an amount less than 0.5 wt % based on the entire glass.

Of the glass of the present invention, the density measured at room temperature is at the most 2.43 g/cc. The present inventors have discovered that in sodalime silicate type glass, the density has a very close relation to abrasion resistance. According to the knowledge obtained by the present inventors, the abrasion resistance becomes extremely high, when the density measured at room temperature becomes at most 2.43 g/cc within the above-mentioned compositional range.

In the present invention, the brittleness index value B proposed by Lawn et al. (B. R. Lawn and D. B. Marshall, J. Am. Ceram. Soc., 62[7–8]347–350(1979)) is used as an index for brittleness (abrasion resistance) of glass. Here, the brittleness index value B is defined by the formula (1) wherein Hv is the Vickers hardness of the material and Kc is the fracture toughness value:

$$B = Hv/Kc \qquad (1)$$

A substantial problem in a case where this brittleness index is applied to glass, is that the fracture toughness value Kc can not accurately be evaluated. Therefore, as a result of a study of several methods, the present inventors have found that the brittleness can quantitatively be evaluated from the relation between the size of the impression of the indenter remaining on the glass surface when the Vickers indenter is indented against the surface and the length of cracks formed from the four corners of the impression. This relation is defined by the formula (2), wherein P is the indentation load of the Vickers indenter, and a and c are, as shown in FIG. 1, the diagonal length of the Vickers impression and the length of the cracks formed from the four corners (the entire length of the two symmetrical cracks inclusive of the impression of the indenter), respectively:

$$c/a = 0.0056 B^{2/3} P^{1/6} \qquad (2)$$

Brittleness of glasses can readily be evaluated by using the formula (2) and the sizes of Vickers impressions formed on the surfaces of various glasses.

Figure 3:
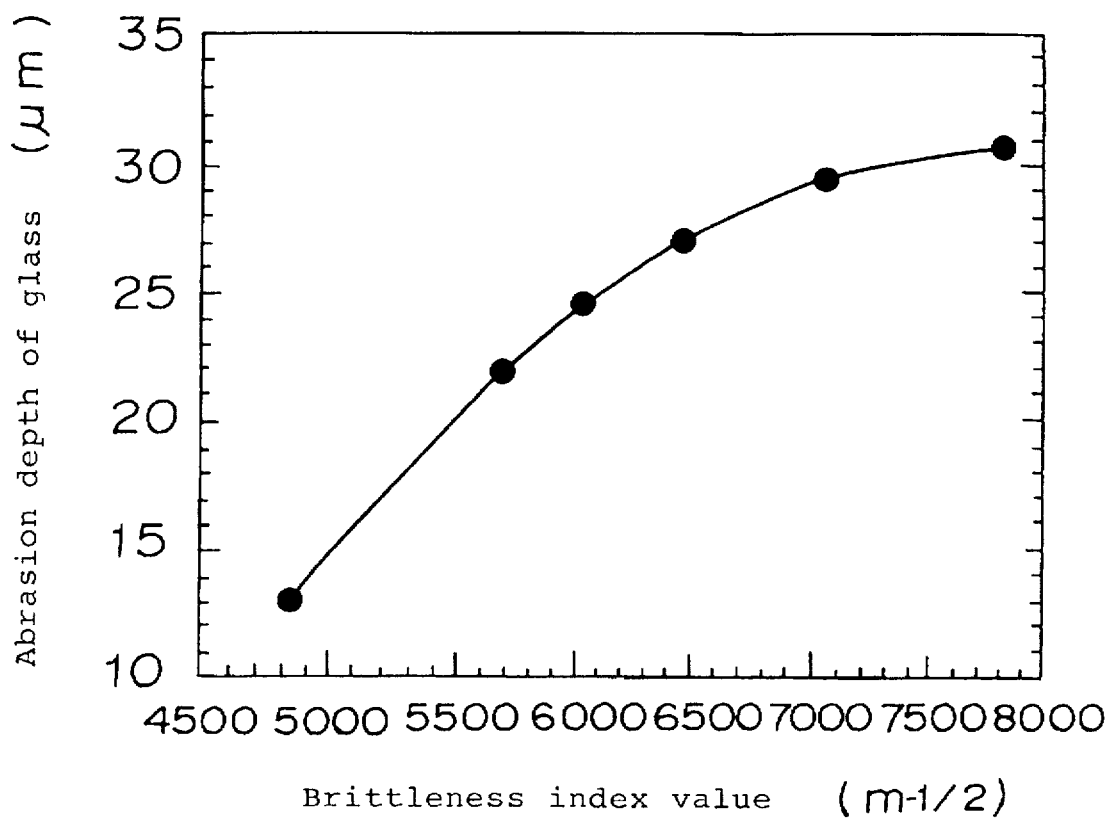
FIG. 3 is a graph showing the relation between the brittleness index value B and the abrasion wear by sand blasting.

FIG. 3 shows a relation between the brittleness index value B thus measured and the abrasion wear by sand blasting. The brittleness index value B and the abrasion wear by sand blasting are in a very strong correlation, and it is evident that the brittleness index value is a very good index for the abrasion resistance. In the following specification, the brittleness index value B obtained by the formula (2) will be used.

From the foregoing, specifically, preferred glass in the present invention consists essentially of the following composition, of which the density measured at room temperature is at most 2.43 g/cc. Here, the upper limit values for MgO, CaO, and RO are values obtained from the values calculated automatically by the total amount and ratio of RO and $R'_2O$ by taking into account the fractions of 0.05 and over as 0.1 and disregarding the rest.

| | |
|---|---|
| $SiO_2$ | 74 to 85.5 (wt %), |
| $B_2O_3$ | 0.5 to 5 (wt %), |
| $SiO_2 + B_2O_3$ | 76 to 88 (wt %), |
| MgO | 1 to 8.6 (wt %), |
| CaO | 0 to 7.6 (wt %), |
| RO | 1 to 8.6 (wt %), |
| $Na_2O$ | 10 to 22 (wt %), |
| $K_2O$ | 0 to 10 (wt %), |
| $Li_2O$ | 0 to 10 (wt %), |
| $R'_2O$ | 10 to 22 (wt %), |
| $Al_2O_3$ | 1 to 5 (wt %). |

Especially when the $SiO_2$ content exceeds 80 wt %, high abrasion resistance and excellent water resistance can be obtained simultaneously essentially within the following compositional range. Here, the upper limit values for MgO, CaO and RO are values obtained from the values calculated automatically by the total amount and ratio of RO and $R'_2O$ by taking into account the fractions of 0.05 and over as 0.1 and disregarding the rest.

| | |
|---|---|
| $SiO_2$ | more than 80 to 85.5 (wt %), |
| $B_2O_3$ | 0.5 to 5 (wt %), |
| $SiO_2 + B_2O_3$ | more than 80.5 to 88 (wt %), |
| MgO | 1 to 6.9 (wt %), |
| CaO | 0 to 5.9 (wt %), |
| RO | 1 to 6.9 (wt %), |
| $Na_2O$ | 10 to less than 17.5 (wt %), |
| $K_2O$ | 0 to less than 7.5 (wt %), |
| $Li_2O$ | 0 to less than 7.5 (wt %), |
| $R'_2O$ | 10 to less than 17.5 (wt %), |
| $Al_2O_3$ | 1 to 5 (wt %). |

On one hand, with the above composition, the melting property is poor as compared with a case where the $SiO_2$ content is at most 80 wt %, whereby the composition is required to be melted at a relatively high temperature. It is more preferred that melting can be conducted at a relatively low temperature, and at the same time, adequate water resistance and abrasion resistance can be obtained. From this viewpoint, one of the preferred compositions consists essentially of the following. Here, the upper limit values for MgO, CaO, RO and $R'_2O$ are values obtained from the values calculated automatically by the total amount and ratio of RO and $R'_2O$ by taking into account the fractions of 0.05 and over as 0.1 and disregarding the rest.

| | |
|---|---|
| $SiO_2$ | 74 to 80 (wt %), |
| $B_2O_3$ | 0.5 to 5 (wt %), |
| $SiO_2 + B_2O_3$ | 76 to 85 (wt %), |
| MgO | 1 to 8.6 (wt %), |
| CaO | 0 to 7.6 (wt %), |
| RO | 2 to 8.6 (wt %), |
| $Na_2O$ | 10 to 17 (wt %), |
| $K_2O$ | 0 to 10 (wt %), |
| $Li_2O$ | 0 to 10 (wt %), |
| $R'_2O$ | 10 to 19.2 (wt %), |
| $Al_2O_3$ | 1 to 5 (wt %), |
| $RO/R'_2O$ (weight ratio) | 0.2 to 0.6. |

If $Na_2O$ exceeds 17 wt %, the water resistance tends to be low. Specifically, the eluted amount of sodium when the glass is exposed to hot water tends to increase. Further, if the weight ratio of $RO/R'_2O$ is less than 0.2, the ratio of RO to $R'_2O$ relatively decreases, and again the water resistance tends to be low.

To obtain better water resistance, it is very effective to incorporate at least 0.5 wt % of $K_2O$ by substituting $K_2O$ for $Na_2O$, although this is not essentially required. It is also effective to incorporate at least 0.5 wt % of CaO by substituting CaO for MgO.

Another preferred composition which is meltable at a relatively low temperature and whereby adequate water resistance and abrasion resistance can be obtained, consists essentially of the following. Here, the upper limit values for MgO, CaO and RO, are values obtained from the values calculated automatically by the total amount and ratio of RO and $R'_2O$ by taking into account the fractions of 0.05 and over as 0.1 and disregarding the rest.

| | |
|---|---|
| $SiO_2$ | 74 to 80 (wt %), |
| $B_2O_3$ | 0.5 to 5 (wt %), |
| $SiO_2 + B_2O_3$ | 76 to 85 (wt %), |
| MgO | 1 to 8.6 (wt %), |
| CaO | 0 to 7.6 (wt %), |
| RO | 1 to 8.6 (wt %), |
| $Na_2O$ | 5 to 19.5 (wt %), |
| $K_2O$ | 0 to 10 (wt %), |
| $Li_2O$ | 0 to 10 (wt %), |
| $K_2O + Li_2O$ | 2.5 to 11 (wt %), |
| $R'_2O$ | 10 to 22 (wt %), |
| $Al_2O_3$ | 1 to 5 (wt %). |

In this composition, if $K_2O+Li_2O$ is less than 2.5 wt %, the water resistance tends to be low. To improve the water resistance, it is effective to incorporate at least 0.5 wt % of CaO by substituting CaO for MgO, like in the above case.

The glass of the present invention thus obtained is typically the one of which the brittleness index value B is at most 6,000 $m^{-\frac{1}{2}}$, preferably at most 5,800 $m^{-\frac{1}{2}}$.

Further, the temperature at which the viscosity becomes 100 poises, is preferably not higher than 1,800° C., more preferably not higher than 1,680° C.

The glass of the present invention has an appropriate melting property, and accordingly various preparation methods may be employed. Namely, various starting materials may be blended by a conventional method to obtain a predetermined composition, which is then heated to from 1,450° to 1,650° C. for melting. Then, this molten glass is refined, then formed into a predetermined shape, followed by gradual cooling to obtain a commercial product.

In the following table, 45 types of glass compositions are disclosed which were studied as glasses of the present invention (Examples 1 to 37) and of Comparative Examples (Examples 38 to 45).

To obtain each composition, 200 g of starting material powder was put into a platinum crucible and heat-melted in the atmosphere at from 1,450° to 1,650° C. for 4 hours with stirring. Substantially uniform glass was obtained in all cases. Glass of each composition uniformly melted, was cast into a carbon mold to form a plate having a size of about 10×10 cm and a thickness of 5 mm, followed by cooling. The obtained glass was annealed at a temperature of from 490° to 570° C. to remove any strain, followed by cutting and polishing to obtain a test sample having a size of 2×2 cm and a thickness of 4 mm.

In the table, the density of the glass, the brittleness index value and the temperature at which the viscosity becomes 100 poise (T(°C.) at $\log \eta = 2$) and the temperature at which the viscosity becomes 10,000 poise (T(°C.) at $\log \eta = 4$), as indices for the melting property, are shown.

The brittleness index value was measured as follows. A sample polished to a mirror surface was further heated to a temperature slightly higher than the strain point temperature of the glass (100° C./hr), maintained (3 hr) and then gradually cooled (60° C./hr) to remove the surface residual stress due to polishing. The brittleness was measured in such a state that the surface heat and processing strain had been substantially completely removed.

For the measurement of brittleness, a Vickers hardness tester was used. By the same apparatus, same impressions were formed on the glass surface, and from the average length of cracks formed from the four corners of each impression and the indentation load of the Vickers indenter, the brittleness index value B was calculated by the formulas (1) and (2). The indentation load was 5 kgf.

The density ρ was calculated from the dry weight and the weight in water of the sample by an Archimedes method. For the measurement, a high precision weighing machine capable of measuring up to μg, was used, and an effective number was calculated up to five figures and the last figure was rounded to take a number of four figures.

In all the Examples of the present invention shown in the table, the brittleness index value B is at most 6,000 $m^{-1/2}$, indicating high abrasion resistance. Further, it is evident that the density and the brittleness of glass are in a good correlation, and as the density decreases, the brittleness index value also decreases, i.e. abrasion marks tend to be hardly formed.

In Examples 1 to 12, $Na_2O$ is from 10 to 17 wt %, and $RO/R'_2O$ is from 0.2 to 0.6. Further, in Examples 13 to 31, at least either one of $K_2O$ or $Li_2O$ is incorporated, and $K_2O+Li_2O$ is adjusted to be from 2.5 to 11 wt %. Further, in Examples 32 to 37, $SiO_2$ exceeds 80 wt %.

On the other hand, Examples 38 to 45 are examples outside the scope of the present invention. Especially, Example 39, 40 and 45 are examples wherein the abrasion resistance was inadequate, although a relatively large amount of $SiO_2$ was incorporated as in the present invention. Namely, it is evident that even if the $SiO_2$ content is simply increased, the remarkable improvement in the abrasion resistance as in the present invention may not sometimes be observed.

Example 45 is an example wherein the abrasion resistance became low, since the density was large, although the composition itself was within the range of the present invention.

TABLE

| Composition Example | Example 1 | Example 2 | Example 3 | Example 4 | Example 5 | Example 6 | Example 7 |
|---|---|---|---|---|---|---|---|
| $SiO_2$ | 75.8 | 75.6 | 76.9 | 76.1 | 77.0 | 77.0 | 77.0 |
| $B_2O_3$ | 1.5 | 2.5 | 0.5 | 1.5 | 1.5 | 1.5 | 1.5 |
| CaO | 0.9 | 0.0 | 2.3 | 0.9 | 3.0 | 4.0 | 6.0 |
| MgO | 2.7 | 4.0 | 1.7 | 2.7 | 1.0 | 1.0 | 1.0 |
| ZnO | 0.0 | 0.0 | 0.0 | 0.0 | 0.0 | 0.0 | 0.0 |
| $Na_2O$ | 15.2 | 14.3 | 15.2 | 13.6 | 12.5 | 11.5 | 10.0 |
| $K_2O$ | 0.0 | 1.0 | 0.0 | 1.7 | 4.0 | 4.0 | 3.5 |
| $Li_2O$ | 0.0 | 0.0 | 0.0 | 0.0 | 0.0 | 0.0 | 0.0 |
| $Al_2O_3$ | 3.9 | 2.6 | 3.4 | 3.4 | 1.0 | 1.0 | 1.0 |
| $SO_3$ | 0.0 | 0.0 | 0.0 | 0.1 | 0.0 | 0.0 | 0.0 |
| $SiO_2 + B_2O_3$ | 77.3 | 78.1 | 77.4 | 77.6 | 78.5 | 78.5 | 78.5 |
| RO | 3.6 | 4.0 | 4.0 | 3.6 | 4.0 | 5.0 | 7.0 |
| $R'_2O$ | 15.2 | 15.3 | 15.2 | 15.3 | 16.5 | 15.5 | 13.5 |
| $RO + R'_2O$ | 18.8 | 19.3 | 19.2 | 18.9 | 20.5 | 20.5 | 20.5 |
| $RO/R'_2O$ | 0.24 | 0.26 | 0.26 | 0.24 | 0.24 | 0.32 | 0.52 |
| ρ (g/cc) | 2.420 | 2.420 | 2.413 | 2.409 | 2.424 | 2.428 | 2.430 |
| B ($m^{-1/2}$) | 5800 | 5800 | 5900 | 4800 | 5200 | 5000 | 4900 |

| Composition Example | Example 8 | Example 9 | Example 10 | Example 11 | Example 12 | Example 13 | Example 14 |
|---|---|---|---|---|---|---|---|
| $SiO_2$ | 77.0 | 77.0 | 77.0 | 77.0 | 76.8 | 76.5 | 77.0 |
| $B_2O_3$ | 1.5 | 1.5 | 1.5 | 1.5 | 1.0 | 5.0 | 1.5 |
| CaO | 0.0 | 0.0 | 0.0 | 0.0 | 0.0 | 0.0 | 0.0 |
| MgO | 4.0 | 5.0 | 6.0 | 7.0 | 2.3 | 1.0 | 1.0 |
| ZnO | 0.0 | 0.0 | 0.0 | 0.0 | 1.0 | 0.0 | 0.0 |
| $Na_2O$ | 12.5 | 11.5 | 10.5 | 10.0 | 15.3 | 10.0 | 15.5 |
| $K_2O$ | 4.0 | 4.0 | 4.0 | 3.5 | 0.0 | 2.5 | 4.0 |
| $Li_2O$ | 0.0 | 0.0 | 0.0 | 0.0 | 0.0 | 0.0 | 0.0 |
| $Al_2O_3$ | 1.0 | 1.0 | 1.0 | 1.0 | 3.4 | 5.0 | 1.0 |
| $SO_3$ | 0.0 | 0.0 | 0.0 | 0.0 | 0.0 | 0.0 | 0.0 |
| $SiO_2 + B_2O_3$ | 78.5 | 78.5 | 78.5 | 78.5 | 77.8 | 81.5 | 78.5 |
| RO | 4.0 | 5.0 | 6.0 | 7.0 | 3.3 | 1.0 | 1.0 |
| $R'_2O$ | 16.5 | 15.5 | 14.5 | 13.5 | 15.3 | 12.5 | 19.5 |
| $RO + R'_2O$ | 20.5 | 20.5 | 20.5 | 20.5 | 18.6 | 13.5 | 20.5 |
| $RO/R'_2O$ | 0.24 | 0.32 | 0.41 | 0.52 | 0.22 | 0.08 | 0.05 |
| ρ (g/cc) | 2.417 | 2.419 | 2.421 | 2.424 | 2.398 | 2.407 | 2.411 |
| B ($m^{-1/2}$) | 5200 | 5700 | 5800 | 4800 | 5100 | 4800 | 5700 |

| Composition Example | Example 15 | Example 16 | Example 17 | Example 18 | Example 19 | Example 20 | Example 21 |
|---|---|---|---|---|---|---|---|
| $SiO_2$ | 78.0 | 79.0 | 80.0 | 78.8 | 77.0 | 77.0 | 77.0 |
| $B_2O_3$ | 1.5 | 1.5 | 1.5 | 1.5 | 1.5 | 1.5 | 1.5 |
| CaO | 0.0 | 0.0 | 0.0 | 0.0 | 1.0 | 2.0 | 0.0 |
| MgO | 1.0 | 1.0 | 1.0 | 1.0 | 1.0 | 1.0 | 2.0 |

TABLE-continued

| | | | | | | | |
|---|---|---|---|---|---|---|---|
| ZnO | 0.0 | 0.0 | 0.0 | 0.0 | 0.0 | 0.0 | 0.0 |
| $Na_2O$ | 14.5 | 13.5 | 12.5 | 13.6 | 14.5 | 13.5 | 14.5 |
| $K_2O$ | 4.0 | 4.0 | 4.0 | 4.0 | 4.0 | 4.0 | 4.0 |
| $Li_2O$ | 0.0 | 0.0 | 0.0 | 0.0 | 0.0 | 0.0 | 0.0 |
| $Al_2O_3$ | 1.0 | 1.0 | 1.0 | 1.1 | 1.0 | 1.0 | 1.0 |
| $SO_3$ | 0.0 | 0.0 | 0.0 | 0.0 | 0.0 | 0.0 | 0.0 |
| $SiO_2 + B_2O_3$ | 79.5 | 80.5 | 81.5 | 80.3 | 78.5 | 78.5 | 78.5 |
| RO | 1.0 | 1.0 | 1.0 | 1.0 | 2.0 | 3.0 | 2.0 |
| $R'_2O$ | 18.5 | 17.5 | 16.5 | 17.6 | 18.5 | 17.5 | 18.5 |
| $RO + R'_2O$ | 19.5 | 18.5 | 17.5 | 18.6 | 20.5 | 20.5 | 20.5 |
| $RO/R'_2O$ | 0.05 | 0.06 | 0.06 | 0.06 | 0.11 | 0.17 | 0.11 |
| $\rho$ (g/cc) | 2.402 | 2.393 | 2.383 | 2.394 | 2.415 | 2.419 | 2.413 |
| B ($m^{-1/2}$) | 5000 | 4800 | 4700 | 4400 | 4300 | 4600 | 4900 |

| Composition Example | Example 22 | Example 23 | Example 24 | Example 25 | Example 26 | Example 27 | Example 28 |
|---|---|---|---|---|---|---|---|
| $SiO_2$ | 77.0 | 77.0 | 77.0 | 77.0 | 77.0 | 77.0 | 77.0 |
| $B_2O_3$ | 1.5 | 1.5 | 1.5 | 1.5 | 1.5 | 1.5 | 1.5 |
| CaO | 0.0 | 0.0 | 0.0 | 0.0 | 0.0 | 0.0 | 0.0 |
| MgO | 3.0 | 1.0 | 1.0 | 1.0 | 1.0 | 1.0 | 1.0 |
| ZnO | 0.0 | 0.0 | 0.0 | 0.0 | 0.0 | 0.0 | 0.0 |
| $Na_2O$ | 13.5 | 15.5 | 14.5 | 13.5 | 12.5 | 11.5 | 10.5 |
| $K_2O$ | 4.0 | 0.0 | 0.0 | 0.0 | 0.0 | 0.0 | 0.0 |
| $Li_2O$ | 0.0 | 4.0 | 5.0 | 6.0 | 7.0 | 8.0 | 9.0 |
| $Al_2O_3$ | 1.0 | 1.0 | 1.0 | 1.0 | 1.0 | 1.0 | 1.0 |
| $SO_3$ | 0.0 | 0.0 | 0.0 | 0.0 | 0.0 | 0.0 | 0.0 |
| $SiO_2 + B_2O_3$ | 78.5 | 78.5 | 78.5 | 78.5 | 78.5 | 78.5 | 78.5 |
| RO | 3.0 | 1.0 | 1.0 | 1.0 | 1.0 | 1.0 | 1.0 |
| $R'_2O$ | 17.5 | 19.5 | 19.5 | 19.5 | 19.5 | 19.5 | 19.5 |
| $RO + R'_2O$ | 20.5 | 20.5 | 20.5 | 20.5 | 20.5 | 20.5 | 20.5 |
| $RO/R'_2O$ | 0.17 | 0.05 | 0.05 | 0.05 | 0.05 | 0.05 | 0.05 |
| $\rho$ (g/cc) | 2.415 | 2.421 | 2.420 | 2.420 | 2.419 | 2.419 | 2.418 |
| B ($m^{-1/2}$) | 5000 | 4900 | 5000 | 5000 | 5100 | 5200 | 5800 |

| Composition Example | Example 29 | Example 30 | Example 31 | Example 32 | Example 33 | Example 34 | Example 35 |
|---|---|---|---|---|---|---|---|
| $SiO_2$ | 76.5 | 77.0 | 76.5 | 81.5 | 80.5 | 81.0 | 82.0 |
| $B_2O_3$ | 1.5 | 1.5 | 1.5 | 1.5 | 5.0 | 1.5 | 1.5 |
| CaO | 0.0 | 0.0 | 0.0 | 0.0 | 0.0 | 0.0 | 0.0 |
| MgO | 1.0 | 1.0 | 1.0 | 3.3 | 1.0 | 1.0 | 1.0 |
| ZnO | 0.0 | 0.0 | 0.0 | 0.0 | 0.0 | 0.0 | 0.0 |
| $Na_2O$ | 10.0 | 13.5 | 10.0 | 10.1 | 10.0 | 11.5 | 10.5 |
| $K_2O$ | 0.0 | 6.0 | 10.0 | 0.0 | 2.5 | 4.0 | 4.0 |
| $Li_2O$ | 10.0 | 0.0 | 0.0 | 0.0 | 0.0 | 0.0 | 0.0 |
| $Al_2O_3$ | 1.0 | 1.0 | 1.0 | 3.6 | 1.0 | 1.0 | 1.0 |
| $SO_3$ | 0.0 | 0.0 | 0.0 | 0.0 | 0.0 | 0.0 | 0.0 |
| $SiO_2 + B_2O_3$ | 78.0 | 78.5 | 78.0 | 83.0 | 85.5 | 82.5 | 83.5 |
| RO | 1.0 | 1.0 | 1.0 | 3.3 | 1.0 | 1.0 | 1.0 |
| $R'_2O$ | 20.0 | 19.5 | 20.0 | 10.1 | 12.5 | 15.5 | 14.5 |
| $RO + R'_2O$ | 21.0 | 20.5 | 21.0 | 13.4 | 13.5 | 16.5 | 15.5 |
| $RO/R'_2O$ | 0.05 | 0.05 | 0.05 | 0.33 | 0.08 | 0.06 | 0.07 |
| $\rho$ (g/cc) | 2.422 | 2.405 | 2.399 | 2.366 | 2.388 | 2.374 | 2.365 |
| B ($m^{-1/2}$) | 5700 | 5800 | 5000 | 5700 | 5200 | 4600 | 4500 |

| Composition Example | Example 36 | Example 37 | Example 38 | Example 39 | Example 40 | Example 41 | Example 42 |
|---|---|---|---|---|---|---|---|
| $SiO_2$ | 82.5 | 85.5 | 64.9 | 80.3 | 75.5 | 70.0 | 74.8 |
| $B_2O_3$ | 1.5 | 1.5 | 5.2 | 0.2 | 6.0 | 7.0 | 5.5 |
| CaO | 0.0 | 0.0 | 4.7 | 9.3 | 8.2 | 9.6 | 4.9 |
| MgO | 1.0 | 1.0 | 0.0 | 0.0 | 0.0 | 0.0 | 0.0 |
| ZnO | 0.0 | 0.0 | 0.0 | 0.0 | 0.0 | 0.0 | 0.0 |
| $Na_2O$ | 10.0 | 10.0 | 15.2 | 10.2 | 10.3 | 13.4 | 14.8 |
| $K_2O$ | 4.0 | 1.0 | 0.0 | 0.0 | 0.0 | 0.0 | 0.0 |
| $Li_2O$ | 0.0 | 0.0 | 0.0 | 0.0 | 0.0 | 0.0 | 0.0 |
| $Al_2O_3$ | 1.0 | 1.0 | 10.0 | 0.0 | 0.0 | 0.0 | 0.0 |
| $SO_3$ | 0.0 | 0.0 | 0.0 | 0.0 | 0.0 | 0.0 | 0.0 |
| $SiO_2 + B_2O_3$ | 84.0 | 87.0 | 70.1 | 80.5 | 81.5 | 77.0 | 80.3 |
| RO | 1.0 | 1.0 | 4.7 | 9.3 | 8.2 | 9.6 | 4.9 |
| $R'_2O$ | 14.0 | 11.0 | 15.2 | 10.2 | 10.3 | 13.4 | 14.8 |
| $RO + R'_2O$ | 15.0 | 12.0 | 19.9 | 19.5 | 18.5 | 23.0 | 19.7 |
| $RO/R'_2O$ | 0.07 | 0.09 | 0.31 | 0.91 | 0.80 | 0.72 | 0.33 |
| $\rho$ (g/cc) | 2.360 | 2.355 | 2.51 | 2.44 | 2.52 | 2.55 | 2.50 |
| B ($m^{-1/2}$) | 4400 | 4200 | 6800 | 6100 | 6900 | 7200 | 6800 |

TABLE-continued

| Composition Example | Example 43 | Example 44 | Example 45 |
|---|---|---|---|
| SiO$_2$ | 69.6 | 58.9 | 76.0 |
| B$_2$O$_3$ | 6.5 | 6.0 | 2.5 |
| CaO | 4.8 | 4.9 | 6.0 |
| MgO | 0.0 | 0.0 | 1.0 |
| ZnO | 0.0 | 0.0 | 0.0 |
| Na$_2$O | 9.2 | 16.0 | 10.0 |
| K$_2$O | 0.0 | 0.0 | 3.5 |
| Li$_2$O | 0.0 | 0.0 | 0.0 |
| Al$_2$O$_3$ | 9.9 | 14.2 | 1.0 |
| SO$_3$ | 0.0 | 0.0 | 0.0 |
| SiO$_2$ + B$_2$O$_3$ | 76.1 | 64.9 | 78.5 |
| RO | 4.8 | 4.9 | 7.0 |
| R'$_2$O | 9.2 | 16.0 | 13.5 |
| RO + R'$_2$O | 14.0 | 20.9 | 20.5 |
| RO/R'$_2$O | 0.52 | 0.31 | 0.52 |
| ρ (g/cc) | 2.48 | 2.49 | 2.46 |
| B (m$^{-1/2}$) | 6200 | 6300 | 6200 |

FIG. 1 is a graph showing the effects for substituting B$_2$O$_3$ for SiO$_2$ in substantially the same composition. Points A, B and C in the Figure represent the compositions and the properties as shown in the following Table.

| Composition | A | B | C |
|---|---|---|---|
| SiO$_2$ | 77.61 | 76.11 | 74.61 |
| B$_2$O$_3$ | 0.00 | 1.50 | 3.00 |
| CaO | 0.93 | 0.93 | 0.93 |
| MgO | 2.65 | 2.65 | 2.65 |
| Na$_2$O | 13.62 | 13.62 | 13.62 |
| K$_2$O | 1.65 | 1.65 | 1.65 |
| Al$_2$O$_3$ | 3.38 | 3.38 | 3.38 |
| SiO$_2$ + B$_2$O$_3$ | 77.61 | 77.61 | 77.61 |
| RO | 3.58 | 3.58 | 3.58 |
| R'$_2$O | 15.27 | 15.27 | 15.27 |
| RO + R'$_2$O | 18.85 | 18.85 | 18.85 |
| RO/R'$_2$O | 0.234 | 0.234 | 0.234 |
| ρ (g/cc) | 2.395 | 2.409 | 2.422 |
| B (m$^{-1/2}$) | 5100 | 4800 | 5400 |
| Tg (°C.) | 515 | 525 | 535 |
| T at logη = 2 | 1663 | 1632 | 1600 |
| T at logη = 4 | 1129 | 1109 | 1089 |

It is evident that addition of B$_2$O$_3$ serves to improve the melting property, and addition of its proper amount serves to improve the abrasion resistance.

Further, separately, with respect to some glasses, as an index for judging the water resistance, eluted amounts of Na$_2$O were measured in the unit of μg/cm$^2$ in such a manner that a sample of 50 mm ×50 mm ×5 mm was polished on both sides (the side surface was a surface cut by a diamond saw), and then immersed in a distilled water at 99° C. for 3 hours. If this eluted amount of Na$_2$O is less than 5 μg/cm$^2$, such glass is considered to have sufficient water resistance. The results are shown in the following Table.

| Composition Example | 5 | 19 | 24 | 37 |
|---|---|---|---|---|
| Eluted amount of Na$_2$O (μg/cm$^2$) | 2.0 | 2.3 | 3.2 | 1.1 |

INDUSTRIAL APPLICABILITY

The glass of the present invention can be produced by a melting method with good productivity, and by using it, it is possible to reduce, for example, a decrease in strength or deterioration in transparency due to the surface defects during its practical use, whereby the useful life of the commercial product can be substantially prolonged, and its reliability can be substantially improved.

Further, the glass of the present invention has a low density and thus is effective for reducing the weight of a product employing it.

The glass of the present invention is essentially hardly scratchable and thus has high durability without applying any particular treatment to the surface. Further, it is excellent also in the melting property, it can be used in a wide range. Especially, it is very suitable for use as a sheet glass.

In a case where it is to be used for bottles, it may be adjusted to a viscosity suitable for blow molding within the compositional range of the present invention, and by suitably adding a colorant component to shield ultraviolet rays, it is also possible to obtain a colored glass bottle such as a bottle for beer. A bottle made of the glass of the present invention is hardly scratchable, free from deterioration in transparency and hardly breakable, and it is suitable for use repeatedly, and further it is possible to reduce the weight of the bottle itself.

Further, the glass of the present invention is suitable as a cover glass for a watch, for which expensive sapphire glass or the like is presently used, from the characteristic of being light and readily scratchable.

Further, in many cases, fracture of glass is caused by small abrasion marks. Accordingly, the glass of the present invention, which is hardly scratchable, is hardly breakable. Accordingly, it is suitable for e.g. mirrors or covers for illumination equipments, which are dangerous in case of fracture.

Further, the glass of the present invention is suitable as glass for a water tank. A water tank is not only very dangerous in that when broken, water contained will flow out all at once together with the broken glass, but also has a problem that the transparency will be impaired when abrasion marks are formed by stones put therein or by other instruments or the like. Accordingly, the glass of the present invention which is hardly scratchable and hardly breakable, is suitable. Further, it is suitable also as cover glasses for meters used outdoors, such as meters for electricity, gasses and city water, of which the transparency is likely to decrease by abrasion marks and thus the visibility is likely to deteriorate.

Further, when glass is placed on the entire surface of a desk or on a part thereof, the glass may have abrasion marks due to cutting operation by a cutter, repeated contact with a mouse of a computer and various other factors, which tend to lead to deterioration of the appearance or to fracture. The abrasion resistant glass of the present invention is suitable for use for such an application. Further, by virtue of light weight as compared with usual glass, it can more easily be used in daily life.

The glass of the present invention is suitable also for a bar code reader or a window material for a copying machine, which is normally scratchable by contact with various foreign matters.

Further, the glass of the present invention is suitable as a glass for various display substrates such as liquid crystal or plasma display substrates, whereby even a small number of fine abrasion marks will be regarded as a defect of the product, and as cover glasses thereof. It is thereby possible to prevent formation of abrasion marks during washing of the glass or during the transportation to a next step, whereby the yield of the products can be improved.

Further, for a hard disk apparatus to be used for a memory apparatus of a computer, an aluminum disk is usually employed. Whereas, a glass disk has a small thermal expansion coefficient as compared with aluminum and undergoes little property change as a function of temperature, and thus, it is employed in a case where high precision is required. The glass having the composition of the present invention is suitable also as glass for such a hard disk, whereby a trouble in memory data due to abrasion marks is less likely to occur, and fracture is less likely.

Further, in an application to bearings or the like, of which abrasion marks on the surface are substantially influential over their performance, a high performance can be maintained for a long period of time by using the glass of the present invention which is hardly scratchable.

Further, it is useful also as a packing material for a heat exchanger or a rectification tower, by processing it into glass beads or other shapes. In such an application, abrasion marks are less likely to form, and fracture is also less likely to result, due to contact with the container or glass materials to one another. Accordingly, the glass of the present invention is suitable in that the initial performance can be maintained.

Further, glass balloons prepared by foaming fine glass particles of the present invention containing a foaming component such as $SO_3$, or glass fibers obtainable by withdrawing the glass of the present invention through pin holes of platinum, are particularly useful as a filler for resins by virtue of their characteristic of being light and hardly breakable.

We claim:

1. Abrasion resistant glass, which consists essentially of the following components:

| | |
|---|---|
| $SiO_2$ | 74 to 85.5 (wt %), |
| $B_2O_3$ | 0.5 to 5 (wt %), |
| $SiO_2 + B_2O_3$ | 76 to 88 (wt %), |
| RO | 1 to 9 (wt %), |
| $R'_2O$ | 10 to 23 (wt %), |
| $RO + R'_2O$ | 11 to 24 (wt %), |
| $Al_2O_3$ | 0 to 5 (wt %), |
| $RO/R'_2O$ (weight ratio) | at most 0.6, | provided that R is at least one member selected from Mg and Ca, and R' is at least one member selected from Li, Na and K, and provided that the density measured at room temperature is at most 2.43 g/cc.

2. The abrasion resistant glass according to claim 1, which consists essentially of the following components:

| | |
|---|---|
| $SiO_2$ | 74 to 85.5 (wt %), |
| $B_2O_3$ | 0.5 to 5 (wt %), |
| $SiO_2 + B_2O_3$ | 76 to 88 (wt %), |
| MgO | 1 to 8.6 (wt %), |
| CaO | 0 to 7.6 (wt %), |
| RO | 1 to 8.6 (wt %), |
| $Na_2O$ | 10 to 22 (wt %), |
| $K_2O$ | 0 to 10 (wt %), |
| $Li_2O$ | 0 to 10 (wt %), |
| $R'_2O$ | 10 to 22 (wt %), |
| $Al_2O_3$ | 1 to 5 (wt %). |

3. The abrasion resistant glass according to claim 1, which consists essentially of the following components:

| | |
|---|---|
| $SiO_2$ | more than 80 to 85.5 (wt %), |
| $B_2O_3$ | 0.5 to 5 (wt %), |
| $SiO_2 + B_2O_3$ | more than 80.5 to 88 (wt %), |
| MgO | 1 to 6.9 (wt %), |
| CaO | 0 to 5.9 (wt %), |
| RO | 1 to 6.9 (wt %), |
| $Na_2O$ | 10 to less than 17.5 (wt %), |
| $K_2O$ | 0 to less than 7.5 (wt %), |
| $Li_2O$ | 0 to less than 7.5 (wt %), |
| $R'_2O$ | 10 to less than 17.5 (wt %), |
| $Al_2O_3$ | 1 to 5 (wt %). |

4. The abrasion resistant glass according to claim 1, which consists essentially of the following components:

| | |
|---|---|
| $SiO_2$ | 74 to 80 (wt %), |
| $B_2O_3$ | 0.5 to 5 (wt %), |
| $SiO_2 + B_2O_3$ | 76 to 85 (wt %), |
| MgO | 1 to 8.6 (wt %), |
| CaO | 0 to 7.6 (wt %), |
| RO | 2 to 8.6 (wt %), |
| $Na_2O$ | 10 to 17 (wt %), |
| $K_2O$ | 0 to 10 (wt %), |
| $Li_2O$ | 0 to 10 (wt %), |
| $R'_2O$ | 10 to 19.2 (wt %), |
| $Al_2O_3$ | 1 to 5 (wt %), |
| $RO/R'_2O$ (weight ratio) | 0.2 to 0.6. |

5. The abrasion resistant glass according to claim 1, which consists essentially of the following components:

| | |
|---|---|
| $SiO_2$ | 74 to 80 (wt %), |
| $B_2O_3$ | 0.5 to 5 (wt %), |
| $SiO_2 + B_2O_3$ | 76 to 85 (wt %), |
| MgO | 1 to 8.6 (wt %), |
| CaO | 0 to 7.6 (wt %), |
| RO | 1 to 8.6 (wt %), |
| $Na_2O$ | 5 to 19.5 (wt %), |
| $K_2O$ | 0 to 10 (wt %), |
| $Li_2O$ | 0 to 10 (wt %), |
| $K_2O + Li_2O$ | 2.5 to 11 (wt %), |
| $R'_2O$ | 10 to 22 (wt %), |
| $Al_2O_3$ | 1 to 5 (wt %). |

6. The abrasion resistant glass according to claim 1, of which the brittleness index value B is at most 6.000 $m^{-\frac{1}{2}}$, where B=Hv/Kc, wherein Hv is the Vickers hardness, and Kc is the fracture toughness value.

7. The abrasion resistant glass according to claim 1, of which the temperature at which the viscosity becomes 100 poise, is not higher than 1,800° C.

8. The abrasion resistant glass according to claim 6, of which the temperature at which the viscosity becomes 100 poise, is not higher than 1,800° C.

* * * * *